(12) United States Patent
Porat (10) Patent No.: US 8,867,555 B2
(45) Date of Patent: Oct. 21, 2014

(54) METHOD AND SYSTEM FOR TRANSPARENT LAN SERVICES IN A PACKET NETWORK

(75) Inventor: Hayim Porat, Tel Aviv (IL)

(73) Assignee: Tejas Networks Ltd, Bangalore (IN)

( * ) Notice: Subject to any disclaimer, the term of this patent is extended or adjusted under 35 U.S.C. 154(b) by 216 days.

(21) Appl. No.: 13/115,135

(22) Filed: May 25, 2011

(65) Prior Publication Data

US 2011/0222551 A1 Sep. 15, 2011

Related U.S. Application Data

(62) Division of application No. 12/483,897, filed on Jun. 12, 2009.

(30) Foreign Application Priority Data

Jun. 12, 2008 (IL) .......................................... 192140

(51) Int. Cl.
*H04L 12/28* (2006.01)
*H04L 12/46* (2006.01)

(52) U.S. Cl.
CPC .......... *H04L 12/462* (2013.01); *H04L 12/4612* (2013.01)
USPC .......................................... 370/401; 370/402

(58) Field of Classification Search
CPC .......................... H04L 12/462; H04L 12/4612
See application file for complete search history.

(56) References Cited

U.S. PATENT DOCUMENTS

| | | | |
|---|---|---|---|
| 7,606,203 B1 * | 10/2009 | Shabtay et al. | 370/332 |
| 2003/0142674 A1 * | 7/2003 | Casey | 370/393 |
| 2003/0174706 A1 | 9/2003 | Shankar et al. | |
| 2004/0037279 A1 * | 2/2004 | Zelig et al. | 370/390 |
| 2004/0165600 A1 * | 8/2004 | Lee | 370/395.53 |
| 2004/0174828 A1 * | 9/2004 | Elie-Dit-Cosaque et al. | 370/254 |
| 2006/0109802 A1 * | 5/2006 | Zelig et al. | 370/258 |
| 2006/0248227 A1 * | 11/2006 | Hato et al. | 709/245 |
| 2007/0165603 A1 | 7/2007 | Yokobori et al. | |
| 2008/0144644 A1 * | 6/2008 | Allan et al. | 370/401 |
| 2009/0296713 A1 * | 12/2009 | Kompella | 370/392 |
| 2012/0300774 A1 * | 11/2012 | Casey et al. | 370/390 |

* cited by examiner

*Primary Examiner* — Phirin Sam
(74) *Attorney, Agent, or Firm* — Deborah A. Gador (57) ABSTRACT

A network apparatus includes a customer network portion having a customer premises equipment (CPE) bridge configured to connect to internal network entities of the customer network portion and to edge bridges of a provider network portion interconnecting separate customer network portions. The CPE bridge is configured to determine a transparent local area network service (TLS) for a packet received from one of the internal network entities based on a media access control (MAC) address of a destination of the packet in a different separate customer network portion. The CPE bridge is also configured to modify the packet to indicate the determined TLS, for the provider network portion to utilize to transmit the packet based on the determined TLS to a second CPE bridge associated with the destination, without the provider network utilizing the destination MAC address.

11 Claims, 10 Drawing Sheets

Prior Art

METHOD AND SYSTEM FOR TRANSPARENT LAN SERVICES IN A PACKET NETWORK

CROSS-REFERENCE TO RELATED APPLICATIONS

This application claims priority under 35 U.S.C. §119 to Israeli Patent Application No. 192140, with inventor Hayim Porat, filed on Jun. 12, 2008, and entitled "Method and System for Transparent LAN Services in a Packet Network," which is herein incorporated by reference in its entirety.

FIELD

Embodiments herein relate to packet communications systems, in general, and, in particular, to methods and systems for providing transparent LAN services (TLS) in packet networks such as in Ethernet networks.

BACKGROUND INFORMATION

Packet carrier networks are composed of bridges or switches that are interconnected to each other using NNIs (Network to Network Interfaces). The bridges at the edges of the network are called "edge bridges", while all interior bridges are called "core bridges". Customers are connected to the edge bridges (either directly or through a CPE (customer premises equipment)) through a UNI (User to Network Interface).

Figure 1:
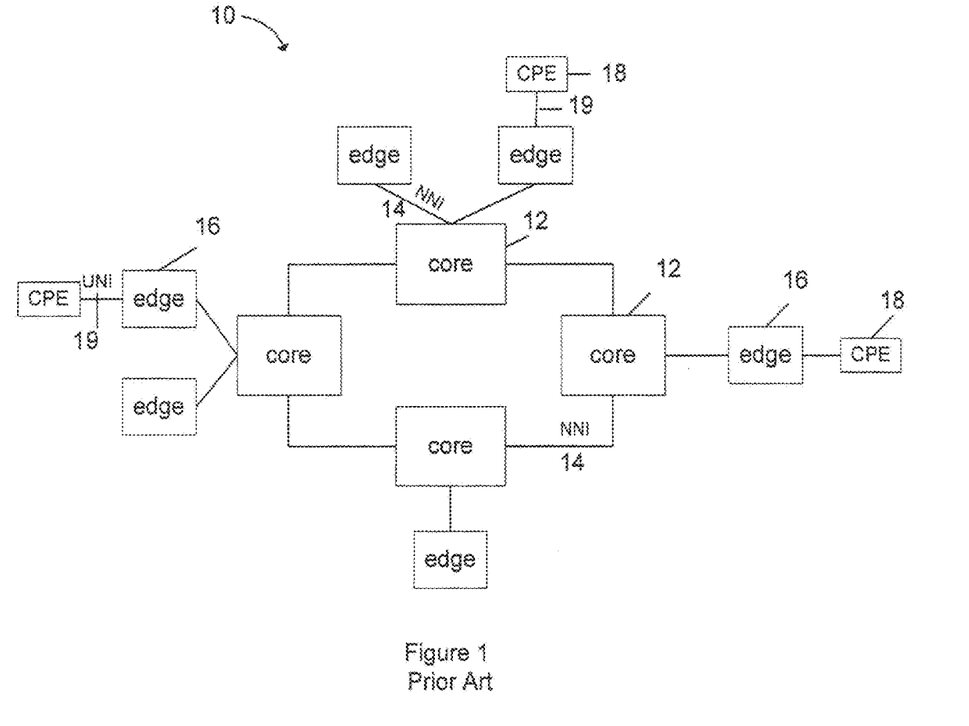
FIG. 1 is a schematic illustration of a prior art packet carrier network.

One example of such a network 10 is illustrated schematically in FIG. 1. Network 10 includes a plurality of core bridges 12 coupled to one another via NNIs 14, a plurality of edge bridges 16, each coupled to one core bridge 12 also via an NNI 14, and a plurality of CPE bridges 18, each coupled to one edge bridge 16 via a UNI 19. The edge, core and CPE bridges have similar structures but different functionalities.

Ethernet is a connectionless oriented packet forwarding technology. It does not have a routing mechanism and its address scheme is based on 48-bit media access control (MAC) addresses. Since this address scheme is not scaleable, in order to provide greater capacity, a partitioning scheme, named VLAN, was introduced.

A VLAN, or virtual LAN, is a logical group of LAN segments, independent of physical location, with a common set of requirements. Several VLANs can co-exist on a single physical bridge. VLANs are configured through software rather than hardware, which makes them extremely flexible. Frames having a VLAN tag carry an explicit identification of the VLAN to which they belong, as well as identifying the specific customer and service. The value of the VLAN Identification (VID) in the tag header of the frame signifies the particular VLAN the frame belongs to. This additional tag field appears in the Ethernet protocol.

As the carrier network may use different bridging standards than the customer (CPE) bridging (for example, because carrier Ethernet bridging must support large scale bridging), the edge bridges are required to translate the frames entering and exiting the carrier network from and to the bridging protocol of the customer equipment. An example is the insertion of a tag at the ingress (UNI) port of the carrier edge bridge and the stripping of the tag at the egress (UNI) port. In an Ethernet network, the tag can be a VLAN tag while, in other networks, other tagging packet methods can be utilized, such as MPLS, VPLS, T-MPLS, etc.

Ethernet VLAN frames are relayed through a series of Ethernet bridges in the network. Each bridge has a VLAN filtering database, which contains rules for forwarding a received data frame. The forwarding is carried out based on the data frame's destination MAC address and associated VID. The filtering database contains both management configured statistical information and dynamically learnt information during bridge operations. In the filtering database, information related to MAC addresses is known as filtering information and the information related to VLANs is known as registration information. Among the decisions made according to the rules in the database, one is whether the frame is to be unicast (forwarded through a single port of the bridge) or multicast (forwarded simultaneously through several ports).

The main problem with VLAN is its limited VID space (4096 unique VIDs in a networking environment). While this space may suffice for enterprise applications, it is much too small for carrier networks, which must support many customers and services. Another problem with VLAN is that, while it limits the number of MAC addresses learned per customer in specific VLAN associated ports, still within this VLAN, all the MAC addresses of all the customers' end stations associated with the port must be learned and stored by each bridge. This is assuming that VLAN to VLAN communication between customers' end stations exists, and thus, their internal VLANs can communicate as well A number of solutions have been proposed for the scalability problem. The first is the so called Q-in-Q solution, also known as Provider Bridge. It entails VLAN stacking or tag stacking, which allows service providers to insert an additional VLAN tag (referred to as provider VLAN) in the Ethernet frame in order to identify the service, thus resulting in a unique 24-bit length label. Even in this system, one provider VLAN is dedicated to one customer (C-VLAN), and therefore the number of supported customers per Service VLAN (S-VLAN) is still limited to 4094. Q-in-Q, therefore, does not solve the problem of the quantity of addresses to be learned, since all the MAC addresses of all the customers' end stations associated with the ports of the specific S-VLAN must be learned and stored.

Figure 2:
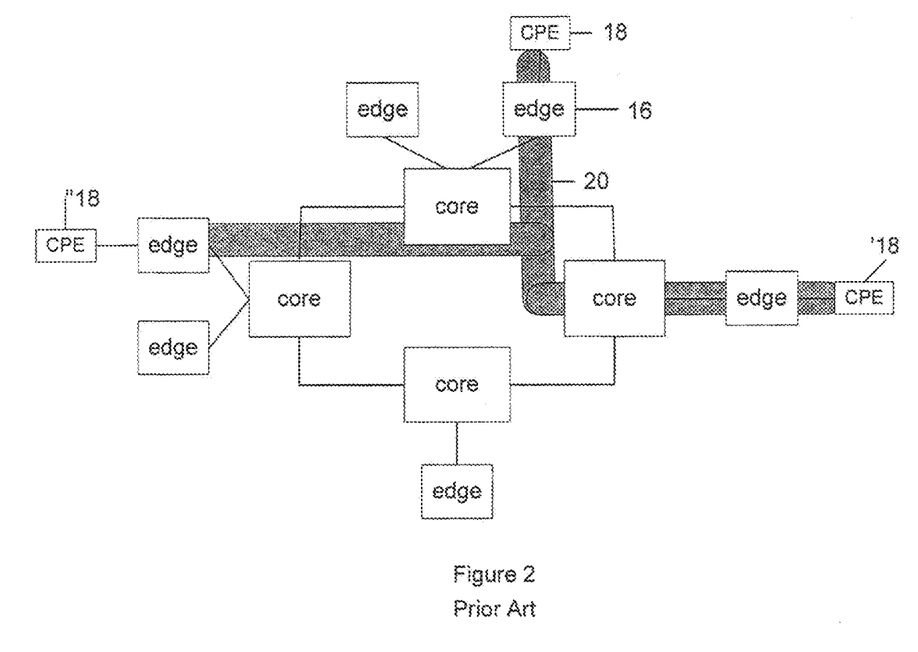
FIG. 2 is a schematic illustration of a prior art TLS service scheme in the carrier network of FIG. 1.
Figure 3:
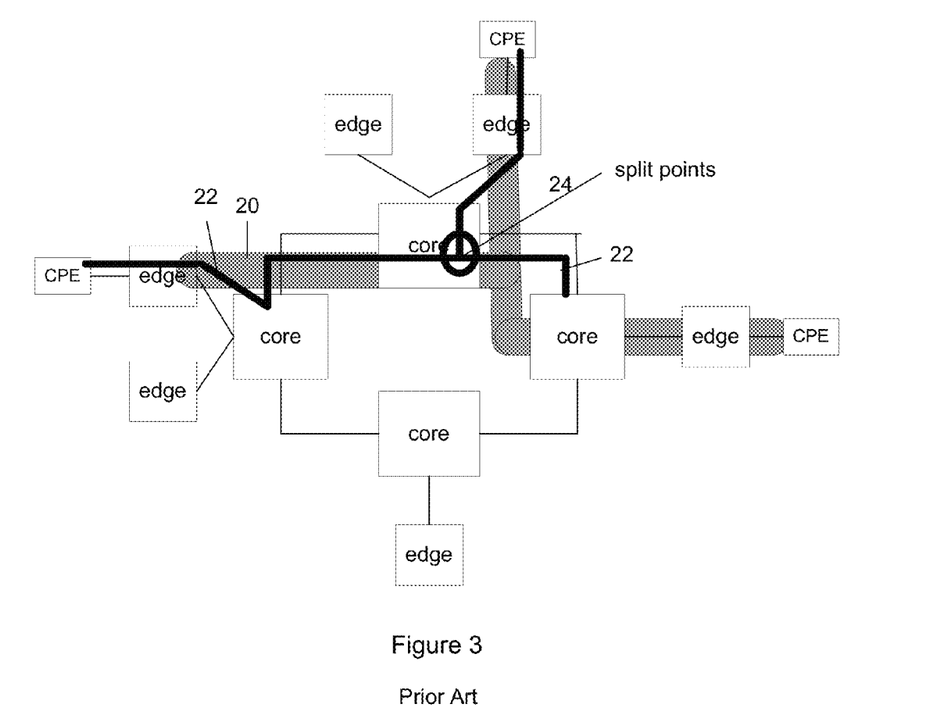
FIG. 3 is a schematic illustration of a prior art TLS implementation using VLAN in the carrier network of FIG. 1.

TLS (Transparent LAN Services) are carrier services provided by carriers to customers, which enable customers to have LAN (local area network) connectivity over a carrier WAN/MAN (Wide area network/Metro area network). TLS means that customers have a service that resembles a private LAN (or VPN "virtual private network"). A logical representation of an example of a TLS scheme 20 on the network of FIG. 1 is shown schematically in FIG. 2. In this example, CPEs 18, 18' and 18" are coupled to one another by TLS 20 and can communicate with one another through the intermediary core and edge bridges, which are transparent to the CPEs. As shown in FIG. 3, in order to provide such a service, the carrier may assign a unique identifier per customer, e.g., a VLAN 22, which distinguishes this specific customer's service instance within the carrier's network from others, for routing packets within the TLS. If the TLS were only point to point between two CPEs, there would be no need for any of the edge devices to learn the clients' MAC addresses of any of the CPEs, since all packets would be routed via VLAN 22. However, as can be seen in the example in FIG. 3, TLS 20 has an intersection or split point 24, where incoming packets have a choice of two egress directions. Since VLAN 22 cannot distinguish between these two CPEs, the edge bridges have no choice but to learn the client MAC addresses of all the CPEs, in order to provide the proper routing.

Thus, there are a number of problems with providing one VLAN for each TLS: 1. The limited numbers of VLANs available; 2. All edge bridges must store all MAC addresses of all customers at each edge bridge, in order to enable per customer bridging; and 3. At each VLAN splitting point (egress at two or more links) within the core, the core bridges also need to store all possible customers' MAC addresses in order to enable forwarding. All networks that provide TLS suffer from these problems, not only Ethernet.

Figure 4:
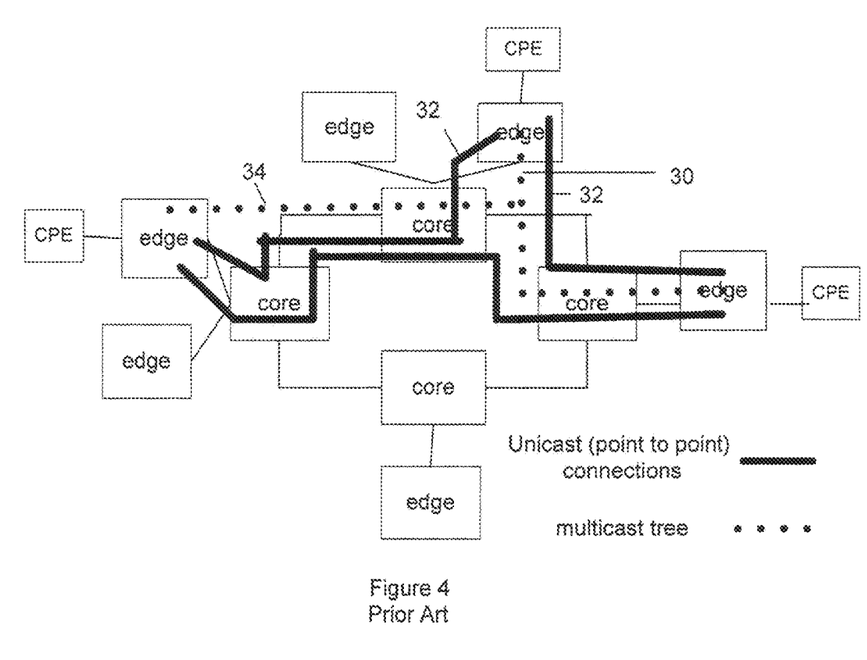
FIG. 4 is a schematic illustration of a prior art TLS implementation using a full mesh implementation in the carrier network of FIG. 1.

Another TLS implementation is to use full mesh connectivity, such as in VPLS or HVLAN, illustrated schematically in FIG. 4. In this implementation, the service 30 is partitioned into all the point to point connections possible between all CPEs out to the edge bridges, and the TLS is implemented over a mesh of unicast, point to point links 32. Each CPE is connected only to its associated edge bridge. Optionally, a separate multicast link 34 can be also added to enable better multicast support. (Since a multicast link (multicast tree) always sends frames to all destinations, regardless of MAC address, there is no need to store customer MAC addresses in the core switches for multicast purposes.)

While this method solves two problems, namely the limited number of VLANs (alleviated by tunneling) and the splitting point at the core (by transforming the service to a set of unicast connections), it still has the drawback of requiring all the edge bridges to store all MAC address of all clients.

An alternative solution proposed for the problem of scalability is known as MAC-in-MAC or PBB (Provider Backbone Bridges), described in the proposed IEEE 802.1ah Provider Backbone Bridges standard. The MAC-in-MAC name refers to the way in which the standard encapsulates Ethernet frames with a Service Provider MAC header. MAC-in-MAC technology overcomes the inherent scalability limitations of VLANs and Q-in-Q networks that make them impractical for use in larger networks by enabling up to 4000 times as many service instances as are supported by traditional VLAN and Q-in-Q networks. Because the switches at the edge encapsulate the traffic with a service provider MAC address, the other switches in the core need only learn the MAC addresses of the core switches.

The problem with PBB arises from the requirements of the edge bridges to provide a bridging instance per customer (as the customer frames are encapsulated with a backbone MAC address) in order to enable TLS. Providing this bridging instance service requires all edge bridges that participate in a specific TLS instance to learn all customers' MACs from all points associated with this service. This leads to huge forwarding tables in the edge devices.

IP networks can also be divided into smaller networks, called subnetworks or subnets. An IP subnet address is created by "borrowing" bits from the host field and designating them as the subnet field. The number of borrowed bits varies and is specified by a subnet mask, which is stored in the router's routing tables. Subnet masks use the same format and representation technique as IP addresses. During IP routing, these subnet masks are used to determine the network (or more specifically, the subnetwork) address.

Subnet masks have recently been proposed by the present applicants' pending application for use in Ethernet networks, in PCT published application WO2008/029415. This application proposes a configurable Ethernet bridge having a filtering database including a plurality of subnet masks for receiving and forwarding frames according to a hierarchical address scheme.

A major problem with subnet masks, as used today, is that the actual addresses are pruned, i.e., only a certain portion is used for routing in the routing tables. And, during pruning, the portion which is not utilized becomes inaccessible for operation, administration and maintenance (OAM). Thus, in case of error in routing or a problem in the network, there is no possibility of retrieving the original address, once a subnet mask has been applied.

A similar problem arises when using conventional tunneling methods of forwarding. Conventional methods (like Q-Q, M-M, HVLAN, etc) reduce the number of forwarding states (i.e., entries in forwarding tables) at the core devices by aggregating many customer service instances (e.g., C-VLANS) into a smaller number of service provider's service instances (e.g., S-VLANs). This is accomplished by forwarding only according to the S-VLAN table. The problem is that, if an OAM operation is needed (for example, to discover why a customer specific service is malfunctioning), it is not possible to check this at the core bridges at a customer level as the core device is only aware of the service tunnels' levels, as a result of the pruning.

Accordingly, there is a long felt need for a packet carrier network which can provide Transparent LAN Services without requiring very large routing tables for MAC addresses, and it would be desirable to use tunneling in such a way that the original service instance remains retrievable in case of need.

SUMMARY

Embodiments discussed herein can provide solutions to the scalability problems of customer MAC address learning associated with TLS in packet carrier networks by distributing the MAC address learning to the customer premises equipment (CPE), rather than requiring each edge bridge to learn all the client MAC addresses. In particular, embodiments of a method provide Transparent LAN Services in a packet network, the method including distributed, client-side, multi VLAN learning. This method enables delivering TLS over tunnels without the need for the core network or edge bridges to learn client MAC addresses. It further proposes utilization and storage of a dual table for addresses and subnet masks, whereby the original address is retained despite the use of subnet masks or other methods of forwarding state reduction.

Embodiments of a method also provide Transparent LAN Services (TLS) in a packet network, the network including a plurality of customer premises equipment (CPEs), each coupled to an edge bridge including at least one Network to Network Interface (NNI) port and one User to Network Interface (UNI) port, the method including computing a full mesh of point to point connections between at least 3 CPEs in the network through at least one edge bridge coupled to each CPE, to form a TLS instance; determining, in each of the CPEs coupled to the bridge, a service tag for tagging incoming customer frames according to customer MAC addresses associations, and using a tag forwarding procedure in the edge bridges according to the service tag, thereby limiting MAC address learning in the edge bridges.

According to one embodiment, the method further comprises at least one core bridge coupled between two of the edge bridges, wherein each core bridge includes a forwarding database, including only addresses after forwarding state reduction, which aggregates many customer service instances, and a storage database containing all customer service instances, storing an original un-reduced address, used for periodic OAM operations.

Embodiments of a system provide Transparent LAN Services (TLS) in a packet network, the network including a plurality of customer premises equipment (CPEs), each coupled to an edge bridge including at least one Network to Network Interface (NNI) port and one User to Network Interface (UNI) port, the system including a full mesh of point to point connections between at least 3 CPEs in the network through at least one edge bridge coupled to each CPE, forming a transparent LAN services (TLS) instance, means, in each of the CPEs coupled to the bridge, for determining a service tag for tagging incoming customer frames according to customer MAC addresses associations, and means in the edge bridges for implementing a tag forwarding procedure for forwarding incoming frames according to the service tag, thereby limiting MAC address learning in the edge bridges.

An embodiment of a network apparatus includes a customer network portion having a CPE bridge configured to connect to internal network entities of the customer network portion and to edge bridges of a provider network portion interconnecting separate customer network portions. The CPE bridge is configured to determine a TLS for a packet received from one of the internal network entities based on a MAC address of a destination of the packet in a different separate customer network portion. The CPE bridge is also configured to modify the packet to indicate the determined TLS, for the provider network portion to utilize to transmit the packet based on the determined TLS to a second CPE bridge associated with the destination, without the provider network utilizing the destination MAC address.

There is also provided an embodiment, for use in a bridge in a packet network, having a database including a forwarding database, including only addresses after forwarding state reduction, which aggregates many customer service instances, and a storage database containing all customer service instances, storing an original un-reduced address, used for periodic OAM operations.

BRIEF DESCRIPTION OF THE DRAWINGS

So that features and embodiments can be understood, a number of drawings are described below. However, the appended drawings illustrate only particular embodiments and are therefore not to be considered limiting of scope.

DETAILED DESCRIPTION OF EXAMPLE EMBODIMENTS

Embodiments are provided of a packet network using a tagging method, e.g., an Ethernet network utilizing VLAN or HVLAN technology, which provide more efficient transparent LAN services (TLS) to its customers than do conventional networks. This can be made possible by providing full mesh topology including the edge bridges and the customer premises equipment (CPEs), which are coupled thereto, and distributing MAC address learning to the CPEs, rather than requiring each edge bridge to learn all the client MAC addresses. An embodiment of a network apparatus includes a customer network portion having a CPE bridge configured to connect to internal network entities of the customer network portion and to edge bridges of a provider network portion interconnecting separate customer network portions. The CPE bridge is configured to determine a TLS for a packet received from one of the internal network entities based on a MAC address of a destination of the packet in a different separate customer network portion. The CPE bridge can be configured to modify the packet to indicate the determined TLS, for the provider network portion to utilize to transmit the packet based on the determined TLS to a second CPE bridge associated with the destination, without the provider network utilizing the destination MAC address.

In one embodiment, in an Ethernet network, the HVLAN forwarding of the embodiment can utilize and store two tables: one fast table, stored in the core bridges, and including only addresses after forwarding state reduction (e.g., pruned or only containing service provider tunnels, e.g., T-CAM based) for per packet forwarding and another storage database, which can be slow and big (containing all customer service instances), wherein the original address is retained despite forwarding state reduction, such as tunneling or pruning. The storage table is also stored in the core bridges and is used for periodic OAM operations. It will be appreciated that "fast" and "slow" relate to data reading/writing time.

Figure 5:
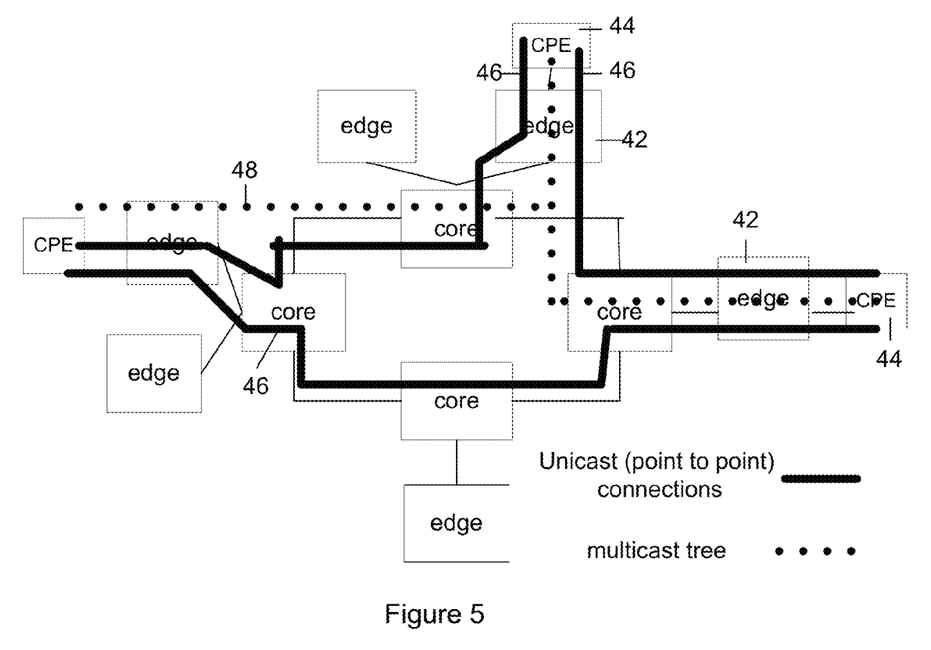
FIG. 5 is a schematic illustration of an embodiment of a TLS implementation in a carrier network.

The basic structure of an exemplary embodiment will now be described with reference to FIG. 5. In the embodiment of FIG. 5, the TLS service, indicated by bold lines, is partitioned into all the point to point connections possible between all CPEs 44 coupled to the edge bridges 42, and the TLS is implemented over a full mesh of unicast, point to point links 46. The CPEs are connected to each other in a logical or virtual mesh. The logical mesh represents a physical mesh, with the service instance tags representing logical ports. Thus, each TLS instance is assigned a set of point to point connections, which provide a different logical mesh per customer TLS instance. Optionally, a multipoint connection 48 is also provided to enable better multicast/broadcast support within the specific TLS instance. When a customer bridge (CPE) is connected to this TLS service, it is configured to this same connection scheme of this TLS instance. The CPEs in this invention perform some of the functions of conventional bridges, mainly associating (by learning) the source MAC addresses with the ports or service instance tags that they originated from. While the embodiment of FIG. 5 includes core bridges, it will be appreciated that core bridges are not necessary in the network. The embodiment depicted in FIG. 5 can be divided into a customer network portion and a provider network portion. The customer network portion includes the CPE bridges and any customer equipment (e.g., internal network entities of the customer network portion) (not shown) that can be connected on the non-edge-bridge side of the CPE bridges. The provider network portion includes the edge bridges, the core bridges, and the interconnecting transmission lines therebetween. The CPE bridges, edge bridges, and core bridges can each include a memory and a processor to store and execute program instructions to perform the functionality discussed herein.

Figure 6:
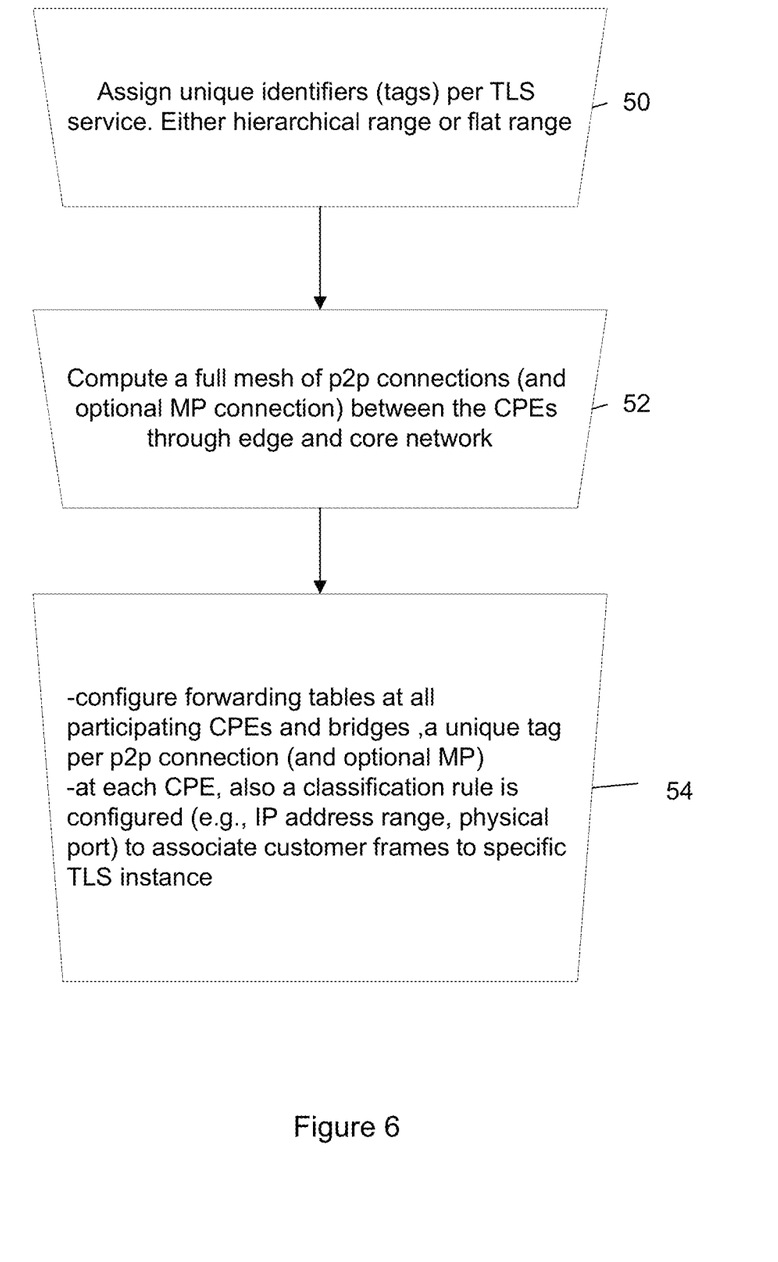
FIG. 6 is a flow chart illustrating the operation of one exemplary embodiment of a TLS implementation in a provisioning stage.

Referring now to FIG. 6, there is shown a flow chart illustrating operation of one exemplary embodiment of a TLS implementation in a provisioning stage. First, unique identifiers (such as port, VLAN etc.) are assigned to each customer, and unique service tags (such as I-SID, H-VLAN, MPLS label, etc.) based on these identifiers are assigned to each point to point connection in each TLS service instance (block 50). Also, these tags are associated in the forwarding databases at least in the CPEs and edge bridges and, optionally, also in the core bridges, with at least one outgoing NNI port and at least one UNI port (meaning, that there should be a forwarding entry per tag). The UNI of the CPE bridge can also be referred to herein as a first interface, and the NNI of the CPE bridge can also be referred to herein as a second interface. The tags may be either hierarchical or from a flat range. A full mesh of point to point connections is computed for the TLS between the CPEs through the edge bridges and core network (block 52). This computation can be accomplished either by a distributed protocol (e.g., line GVRP (Generalized VLAN registration protocol) or by configuration by an external agent (e.g., an NMS (Network Management System)). An optional multi-cast connection can also be computed (block 52). Each participating CPE and bridge is now configured with a unique tag per point to point connection and optional multi-point connection, and corresponding appropriate forwarding databases are generated (block 54). At each CPE, a classification rule is also configured, for example, an IP address range, physical port, etc., to associate customer frames MAC addresses with a specific TLS instance.

Figure 7:
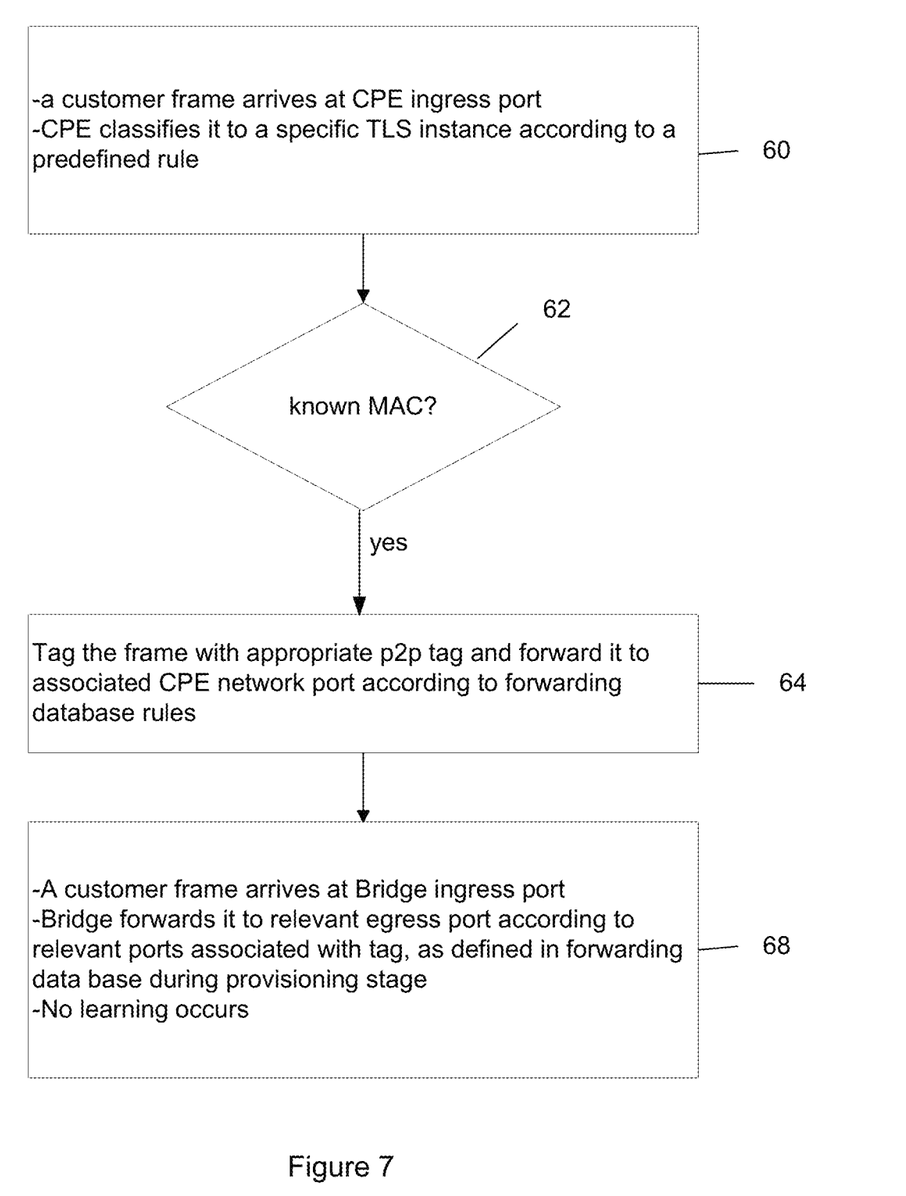
FIG. 7 is a flow chart illustrating operation of one exemplary embodiment of a TLS implementation in normal operation from a customer to the network.

Once the network has been configured, an embodiment of normal operation from a customer to the network is illustrated in the flow chart in FIG. 7. The MAC address learning process for this service can be as follows. When an Ethernet frame with a new destination MAC address of a customer arrives at the ingress port of one of the CPEs (as in the case of ARP (Address Resolution Protocol)), it is classified, according to the rules defined in the provisioning stage, to a specific TLS instance (block 60). The ingress port of the CPE determines whether the destination MAC address of the incoming frame is a known MAC address (block 62). If yes, the frame is tagged with an appropriate point to point tag and forwarded to an associated CPE network port, according to rules in the CPE forwarding table (block 64).

It will be appreciated that when the tagged customer frame arrives at a bridge ingress port (block 68), the bridge will forward it to the relevant egress port, according to the tag assigned to each port (as defined by the forwarding data base during the provisioning stage). Thus, in this case, no learning is required.

Figure 8:
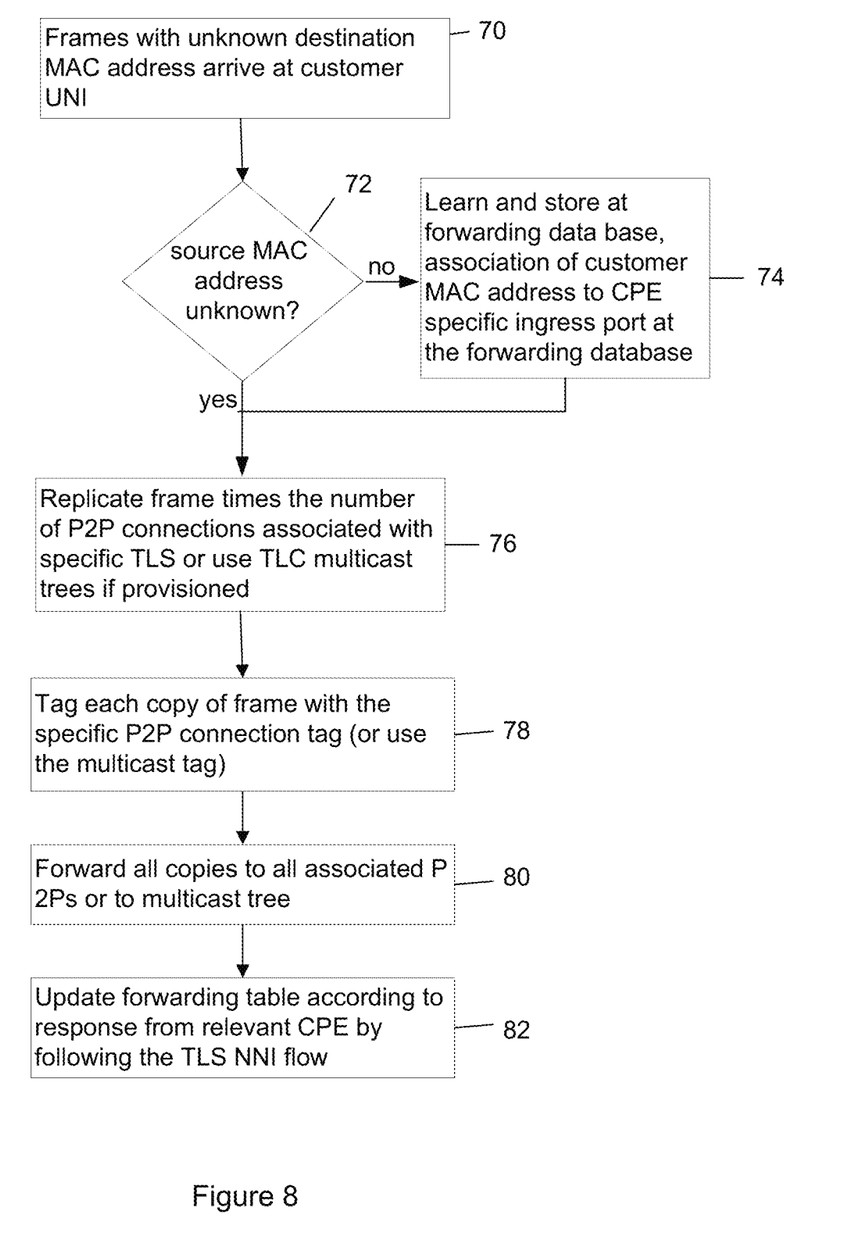
FIG. 8 is a flow chart illustrating a learning process according to one exemplary embodiment.

If the destination MAC address of the frame arriving at the CPE is unknown, learning is performed (block 66). If a frame comes with an unknown source MAC address from a port or a service instance tag, the CPE will learn that this source lies beyond this (virtual) port and, if the CPE gets a frame from another port with a destination MAC address of that same source, it will forward the frame to this port. One embodiment of a method of learning is illustrated in FIG. 8. When a frame having an unknown destination MAC address arrives in the customer UNI (block 70), the CPE determines whether or not the source MAC address is known (block 72). If not, the CPE must learn with which specific CPE ingress port the customer MAC address is associated and store it in its forwarding database (block 74). In practice, if the source MAC address is not known, then the CPE learns that this source MAC address comes to this particular ingress port and stores this MAC address, associated with that port or service instance tag, in its forwarding database (block 74). According to one embodiment, the forwarding data base resolves uncertainties regarding which TLS tag to use by manual configuration, i.e., the classification rules are configured manually (e.g. UNI port no. 1 and NNI port number 2 are associated with service tags that belong to a specific TLS service at a specific CPE). Later, if the CPE gets a frame from another port with a destination MAC address that is the same as that source address, the CPE will forward the frame to the associated (virtual) port for forwarding to the source. So, first, the CPE learns the associated source MAC address port.

Once this learning process has been completed, or if the source MAC address is known (block 72), then the CPE will broadcast the frame with the unknown destination MAC address to all its ports (using all the service tags) and, when a response comes (in which the unknown destination MAC address is now the source MAC address), the CPE will register the association. According to the exemplary method illustrated in FIG. 8, the frame is replicated according to the number of point to point connections associated with that specific TLS instance (block 76). Alternatively, a TLS multicast tree may be utilized, if it was provisioned previously. Each copy of the frame is tagged with one of the tags associated with this TLS instance or with the multicast tag (block 78). The copies are now forwarded to all the associated point to point connections or to the multicast tree (block 80).

The relevant end point (CPE) of the associated connection will indicate to the sending CPE that the frame was addressed to it by sending a response such as, for example, is done in ARP. According to the responses from the associated end points, the CPE will associate the destination MAC address with a specific connection's tag, (be it HVID, I-SID, VLAN, etc.), by inserting or updating an entry in the forwarding databases and, from now on, the relevant learned tag will be inserted into all frames addressed to this destination MAC address (block 82).

This method distributes the MAC learning or multi VLAN learning to the client side (CPEs) instead of to the edge bridges and, thus, relieves the carrier network of the necessity of learning up to millions of MAC addresses for each edge bridge. Further, this method enables delivering TLS over tunnels without the need for learning client MAC addresses at the core network.

Figure 9:
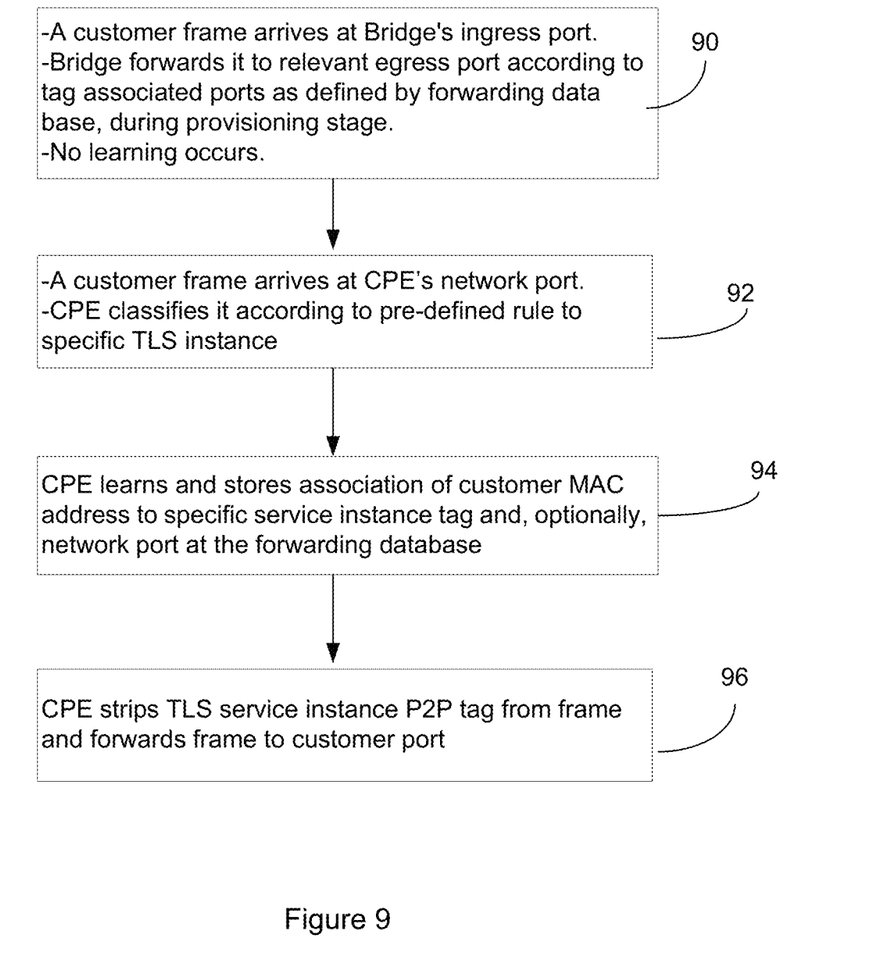
FIG. 9 is a flow chart illustrating operation of one exemplary embodiment of a TLS implementation in normal operation from the network to a customer.

FIG. 9 is a flow chart illustrating operation of one exemplary embodiment of a TLS implementation in normal operation from the network to a customer. A customer frame arrives at a bridge's ingress port. The bridge forwards it to the relevant bridge egress port associated in the forwarding database with that tag, during the provisioning stage (block 90). No learning is required.

When a customer frame arrives at a CPE network port, the CPE classifies it according to a pre-defined rule and assigns it to the appropriate TLS instance (block 92). The CPE's tasks are to learn and store the association of the customer source MAC address to a CPE specific service instance tag and, optionally, to a network port, in the forwarding database (block 94). It will be appreciated that, if there is more than one port, then the specific network ports (and the specific tags associated with these ports) must be configured during the configuration stage by the operator. The CPE now strips the TLS service instance point to point tag from the received frame, and forwards the frame to the appropriate customer port (block 96).

When the network incorporates a hierarchical address scheme for forwarding and provides Transparent LAN services (TLS), a different addressing scheme is used. For example, when using HVLAN forwarding in an Ethernet network, an HVID range is provided at the provider network for each TLS instance. The tag range of the HVIDs that is allocated to each TLS instance is assigned such that it belongs to a specific subnet, e.g. 1000-10050, which belongs to the subnet mask 100.XX. Within this range, each point to point connection has its unique HVID range with the same subnet mask. One of the HVIDs may, optionally, be a multicast HVID, while others can be point to point. HVLAN pruning can be used to reduce the number of entries in the forwarding database at the carrier bridges (both core and edge). In this case, HVLAN frames can be forwarded through configurable Ethernet bridges which include a filtering database using hierarchical addressing and incorporating an appropriate subnet mask for each filtering rule (i.e., each database entry includes a port, HVID and subnet mask, as a minimum.).

Alternatively, the same method can be employed when utilizing hierarchical MAC addresses instead of HVIDs.

While embodiments have been described in particular with regard to Ethernet frames, embodiments of the method can be employed also in any other packet forwarding network involving class based or classless tunneling (i.e., using forwarding state reduction). Thus, in tunneling, a tunnel ID that is essentially a fixed mask size is utilized. All TLS instances belonging to the same tunnel will have the same tunnel ID.

Packet forwarding devices, like Ethernet bridges, typically store the forwarding rules as entries in a special memory, e.g., a Content Addressable Memory (CAM). CAM is used because it is "fast", i.e., has a relatively short processing time. However, since it is very expensive, when using methods like tunneling (Q-Q, MAC-MAC, HVLAN, HVPLS, etc.), only the service tunnel tags (like S-VLAN, Pruned HVLAN range, MPLS TAG, etc.) are stored in the CAM. All of the customer's specific service tags remain stored only in the edge devices.

When there is a failure of a specific customer service, OAM can only be carried out at the edges, as these are the only devices that store the customers' service instances. In general terms, each service that is tunneled (either classless or class based) has the following identifiers: tunnel(s) ID(s) and service instance ID. Only edge devices store and are aware of the service instance ID. Network devices are only aware of the tunnel ID. If there are several nested tunnel IDs, as in Q-in-Q, different network entities will store different tunnel hierarchies but, again, only the edge devices will be aware of the TLS instance ID. For example, when the point to point flows for a TLS service are based on a hierarchical HVLAN range and this range is pruned at the core, only the pruned tags are stored in the CAM. Thus, there is no way to check a specific HVID at the core, as it is masked at the sub-netted HVID group entry and subnet mask.

On the other hand, OAM queries are scarce and do not require per frame processing. Thus, a slower, cheaper memory can be used for storing the original, un-masked entries, so when an OAM request is sent, a deep analysis and per service response can be achieved at a minimal hardware cost.

Figure 10:
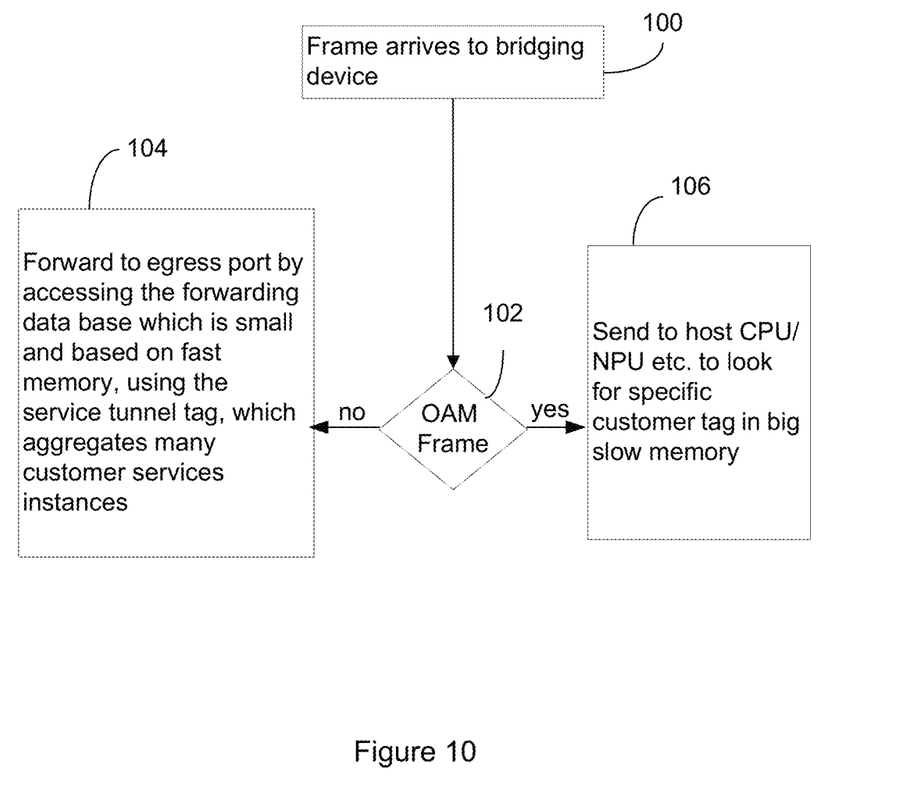
FIG. 10 is a flow chart illustrating schematically operation of one embodiment of forwarding databases.

FIG. 10 is a flow chart schematically illustrating operation of forwarding databases, according to an exemplary embodiment. When a frame arrives to a bridging device (block 100), the frame is examined to determine whether it is a data frame or an OAM frame (block 102). If it is not an OAM frame, the frame is forwarded to an appropriate egress port (block 104) by accessing the forwarding database, which is based on fast memory (e.g., CAM) using the (pruned) service tunnel tag, or other address after forwarding state reduction, which aggregates many customer service instances. Thus, this fast memory can be relatively small, since it only contains the pruned tags. If, however, the frame is an OAM frame, the frame will be sent to the host CPU, NPU, etc., (block 106) to look for the specific, un-pruned customer tag in a storage memory, which can be large and slow.

Many variations, modifications and other applications of embodiments described herein may be made. For example, aspects and components of various embodiments described herein can be combined and mixed to create further embodiments. It will further be appreciated that embodiments are not limited to what has been described hereinabove merely by way of example.

The invention claimed is:

1. A network apparatus, comprising:
   a customer network portion having a customer premises equipment (CPE) bridge configured to connect to internal network entities of the customer network portion and, via Point to Point (P2P) connections, to edge bridges of a provider network portion interconnecting separate customer network portions,
   wherein the CPE bridge is configured to:
   determine a transparent local area network service (TLS) for a packet received from one of the internal network entities based on a media access control (MAC) address of a destination of the packet in a different separate customer network portion, and
   modify the packet to indicate the determined TLS, for the provider network portion to utilize to transmit the packet, via a P2P connection, based on the determined TLS to a second CPE bridge associated with the destination, without the provider network learning the destination MAC address.

2. The network apparatus of claim 1, further comprising:
   the provider network portion having a plurality of edge bridges configured to perform the transmitting the packet via P2P connections to the second CPE bridge associated with the destination based on the determined TLS without learning the destination MAC address.

3. The network apparatus of claim 1, wherein the CPE bridge includes a first interface to communicate with the internal network entities of the customer network portion and a second interface to communicate with at least one edge bridge of the provider network portion.

4. The network apparatus of claim 1, wherein the CPE bridge includes a memory and a processor configured to store and execute program instructions to: receive the packet from the internal network entity, determine from the received packet the destination MAC addresses, determine a TLS service tag based on the destination MAC address, modify the received packet to include the TLS service tag, and transmit the modified packet to one of the edge bridges of the provider network portion.

5. The network apparatus of claim 1, wherein each edge bridge includes a processor and memory configured to store and execute program instructions to: receive the modified packet from the CPE bridge, determine a destination CPE bridge and corresponding edge bridge based on the TLS service tag, and transmit the modified packet toward the destination CPE bridge and corresponding edge bridge through the provider network portion according to the TLS service tag.

6. The network apparatus of claim 1, wherein the CPE bridge is further configured to: receive a second packet, having a second TLS service tag, from the edge bridge, determine from the received second packet a port internal to the customer network portion, modify the received second packet to remove the second TLS service tag, and transmit the modified received second packet to a destination internal to the customer network portion.

7. The network apparatus of claim 1, further comprising: a plurality of the customer network portions, separate from each other and interconnected by the provider network portion.

8. The network apparatus of claim 7, wherein the CPE bridge includes a memory configured to store associations between each possible source-destination pair of CPE bridges and TLS service tags.

9. The network apparatus of claim 7, further comprising an edge bridge of the provider portion having a memory configured to store associations between each possible source-destination pair of CPE bridges and TLS service tags.

10. The network apparatus of claim 1, wherein the CPE bridge is configured to learn associations between customer network portion MAC addresses and TLS service tags by examining and recording associations between MAC addresses and TLS service tags of packets incoming to the CPE bridge from the different separate customer network portions.

11. The network apparatus according to claim 1, wherein said packet is an Ethernet packet.

\* \* \* \* \*